US008977908B2

(12) United States Patent
Qiu et al.

(10) Patent No.: US 8,977,908 B2
(45) Date of Patent: Mar. 10, 2015

(54) METHOD AND APPARATUS FOR DETECTING A SUSPECT MEMORY LEAK

(75) Inventors: Jie Qiu, Beijing (CN); Hai Shan Wu, Beijing (CN); Jie Yang, Beijing (CN); Tao Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 13/596,095

(22) Filed: Aug. 28, 2012

(65) Prior Publication Data

US 2013/0055034 A1 Feb. 28, 2013

(30) Foreign Application Priority Data

Aug. 31, 2011 (CN) .......................... 2011 1 0254183

(51) Int. Cl.
*G06F 11/00* (2006.01)
*G06F 11/07* (2006.01)
*G06F 11/34* (2006.01)

(52) U.S. Cl.
CPC ............ *G06F 11/073* (2013.01); *G06F 11/076* (2013.01); *G06F 11/3466* (2013.01); *G06F 11/3452* (2013.01)
USPC ....................................................... 714/47.1

(58) Field of Classification Search
CPC ............ G06F 11/3409; G06F 11/3466; G06F 11/0793; G06F 11/0751
USPC ....................................................... 714/47.1
See application file for complete search history.

(56) References Cited

U.S. PATENT DOCUMENTS

| 7,254,750 | B1* | 8/2007 | Okun et al. .................. 714/47.2 |
| 7,434,206 | B2 | 10/2008 | Seidman et al. |
| 7,496,615 | B2 | 2/2009 | Broussard |
| 7,496,795 | B2 | 2/2009 | Minshall et al. |
| 7,577,943 | B2 | 8/2009 | Chilimbi et al. |
| 7,757,202 | B2 | 7/2010 | Dahlstedt et al. |
| 7,793,161 | B2 | 9/2010 | Chen et al. |
| 7,870,170 | B2 | 1/2011 | Achanta et al. |
| 7,870,358 | B2 | 1/2011 | Yang |

(Continued)

OTHER PUBLICATIONS

Dictionary definition for "memory leak", retrieved from http://en.wikipedia.org/wiki/Memory_leak on Mar. 20, 2014.*
Aiken, Alex and Xie, Yichen, Context- and Path-Sensitive Memory Leak Detection, ESEC/FSE-13 Proceedings of the 10th European Software Engineering Conference, Sep. 5, 2005, URL: http://portal.acm.org/citation.cfm?id=1081728.

(Continued)

*Primary Examiner* — Yair Leibovich
(74) *Attorney, Agent, or Firm* — David J. Zwick; Jennifer R. Davis (57) ABSTRACT

A method for determining a suspect memory leak, including: sampling the throughput and memory usage of an application server; based on the sampled throughput, monitoring whether the throughput decrease continually, and based on the sampled memory usage, monitoring whether the memory usage remains stable within a predefined range; in response to a continual decrease of the throughput and the memory usage remaining stable within the predetermined range, determining that the application server is suspected of having a memory leak. Using the solution of the present invention can free an administrator of the burden of artificially identifying suspect servers, can identify a suspect server during runtime and further determine whether it actually has a memory leak.

19 Claims, 4 Drawing Sheets

(56) References Cited

U.S. PATENT DOCUMENTS

| | | | |
|---|---|---|---|
| 2003/0079154 A1* | 4/2003 | Park et al. | 714/1 |
| 2003/0182550 A1* | 9/2003 | Chen et al. | 713/167 |
| 2005/0028140 A1* | 2/2005 | Ayachitula et al. | 717/116 |
| 2007/0255773 A1* | 11/2007 | Simeonov et al. | 707/206 |
| 2007/0255775 A1* | 11/2007 | Manolov et al. | 707/206 |
| 2008/0294936 A1* | 11/2008 | Hogstrom et al. | 714/8 |
| 2008/0301504 A1* | 12/2008 | Chen et al. | 714/42 |
| 2011/0161614 A1 | 6/2011 | Krauss | |
| 2013/0324111 A1* | 12/2013 | Tontinuttanon et al. | 455/424 |

OTHER PUBLICATIONS

Tang et al., "LeakSurvivor: Towards Safely Tolerating Memory Leaks for Garbage-Collected Languages," usenix, Apr. 29, 2008, p. 1-21, http://static.usenix.org/events/usenix08/tech/full_papers/tang/tang_html/leaksurvive.html, Accessed on: Aug. 5, 2014.

State IP Office of the P.R.C, "SIPO Office Action," China Office Action, Aug. 4, 2014, International Application No. 201110254183.6.

\* cited by examiner

METHOD AND APPARATUS FOR DETECTING A SUSPECT MEMORY LEAK

CROSS REFERENCE TO RELATED APPLICATION

This application claims priority under 35 U.S.C. 119 from Chinese patent application number 201110254183.6 filed Aug. 31, 2011, the entire contents of which are incorporated herein.

BACKGROUND OF THE INVENTION

1. Field of the Invention

The present invention relates to the field of determining a suspect memory leak, and particularly to an improved method and system for detecting a memory leak.

2. Description of Related Art

A memory leak in a server will cause the available memory and performance of the server to decrease continually, and finally cause the server down due to insufficient memory and unable to respond to any request, bringing about severe damages. In the prior art there are various methods for analyzing memory leaks, but they all analyze the server suspected of having a memory leak to determine whether a memory leak actually occurs and to analyze the root cause thereof, that is, the prior art solutions are based on the precondition that a memory leak has already occurred or is suspected to have already occurred.

As a commonly used method, a server suspected of having a memory leak is identified by an administrator artificially through analyzing the log when the server goes down, and then a technical solution in the prior art is used to analyze the memory leak. However, this method depends too much on the administrator's experience, and especially for application servers deployed in a large scale, picking a suspect application server would be extremely time consuming.

In addition, since a current memory leak analysis method has a very high runtime overhead, and there are a lot of objects and complex relationships among the objects in an application server, the detection and analysis of the memory leak problem are very complex, and the detection of a suspect memory leak cannot be performed during runtime.

Therefore, there is a need for a solution that can free the administrator from the burden of identifying a suspect server artificially, and identify a suspect server during runtime; and there is still room for improvement in the prior art.

SUMMARY OF THE INVENTION

According to a first aspect of the present invention, a method for determining a suspect memory leak, includes the steps of: sampling the throughput and memory usage of an application server; monitoring, based on the sampled throughput, whether the throughput decreases continually, and monitoring, based on the sampled memory usage, whether the memory usage remains stable within a predefined range; and determining, in response to a continual decrease of the throughput and the memory usage remaining stable within the predetermined range, that the application server is suspected of having a memory leak.

According to a second aspect of the present invention, apparatus for detecting a suspect memory leak, includes: a sampling component configured to sample the throughput information and memory usage information of an application server; a monitoring component configured to monitor whether the throughput decreases continually based on the sampled throughput, and to monitor whether the memory usage is stable within a predetermined range based on the sampled memory usage; and a determining component configured to, in response to a continual decrease of the throughput and the memory usage being within a predetermined range, determine the server suspected of having a memory leak.

BRIEF DESCRIPTION OF THE DRAWINGS

The appended claims set forth inventive features considered characteristic of the present invention. However, the present invention itself, as well as preferred use modes, objects, features and advantages thereof will be better understood by referring to the following detailed description of exemplary embodiments when read in conjunction with the drawings, in which:

DETAILED DESCRIPTION OF PREFERRED EMBODIMENTS OF THE INVENTION

One skilled in the art will appreciate the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
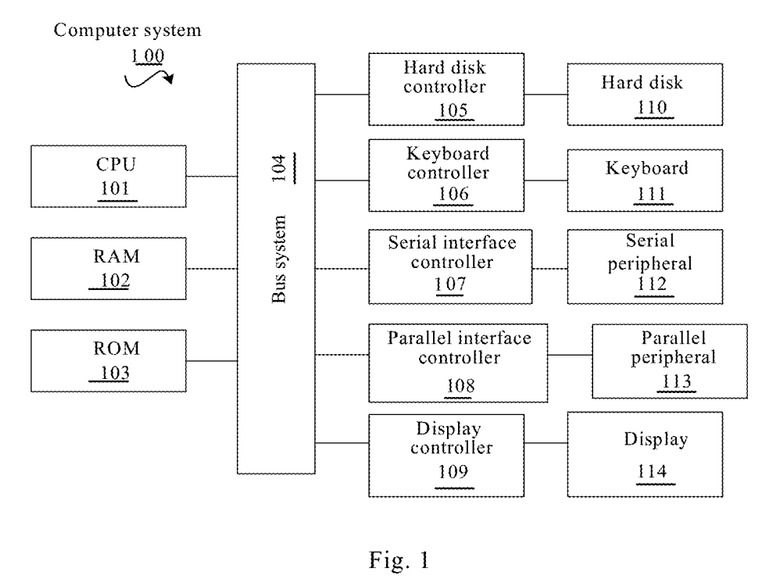
FIG. 1 illustrates an exemplary computing system in which an embodiment of the present invention may be realized.

Now referring to FIG. 1, it shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

Figure 2:
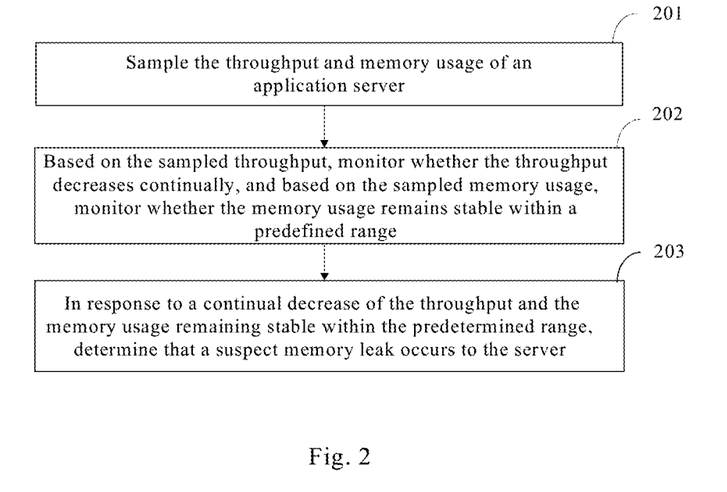
FIG. 2 is a flow diagram of a method for detecting a suspect memory leak of the present application.

FIG. 2 illustrates a flow diagram of a method for detecting a memory leak of the present application, including:

In step 201, sampling the throughput and memory usage of an application server. Here, the throughput information is the number of requests that each application server can serve in a unit time, for example, the number of requests served each second. The memory usage information is the overall consumption or usage of the memory of the application server, for example, memory usage percentage information, available memory amount information, etc. In the following embodiments, description will be presented by taking the memory usage percentage as an example, however, those skilled in the art will understand that other types of memory usage information are also applicable to those embodiments. Collection of the above information may be performed in a periodic or non-periodic manner.

In an embodiment, the sampling is performed according to the period of flow control. The flow control refers to controlling the throughput of the application server according to the memory usage, so that the memory usage does not exceed a target memory usage. In an embodiment, a flow controller may be used to control the flow, and since the flow controller and how to control flow are known techniques in the art, they are not described here. In another embodiment, the above information can also be collected after garbage collection to enhance the accuracy of the collected information.

In Step 202, based on the sampled throughput, monitoring whether the throughput decreases continually, and based on the sampled memory usage, monitoring whether the memory usage remains stable within a predefined range.

Figure 3A:
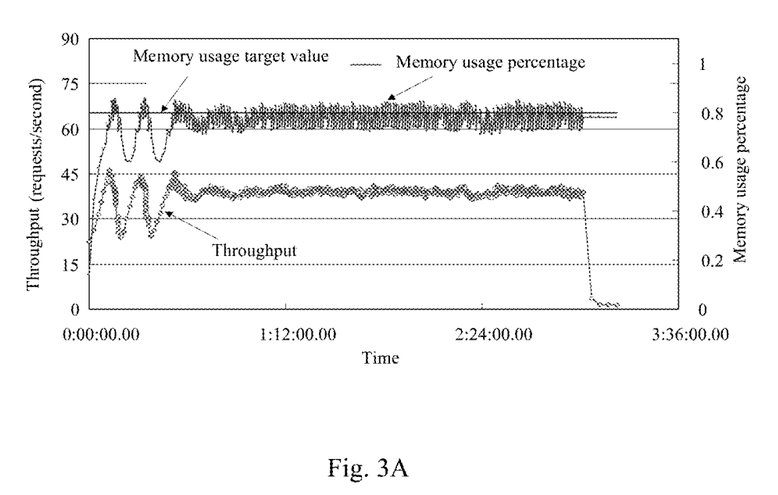
FIG. 3A is a schematic diagram of when there is no memory leak.

Referring to FIG. 3A, a schematic diagram is shown of the memory usage percentage and throughput in a normal case where there is no memory leak. Under the action of the flow controller, the memory usage percentage remains stable close to the target value, and the number of requests processed by the application server per unit time is also stable, i.e., with a stable throughput.

Figure 3B:
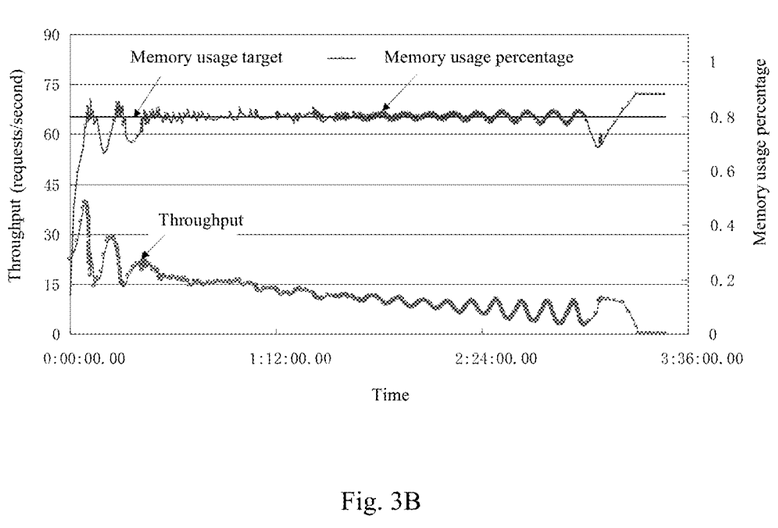
FIG. 3b is a schematic diagram of when there is a memory leak.

Referring to FIG. 3B, a schematic diagram is shown of a memory leak occurring. With the increase of the unreleased memory, the throughput of the application server will decrease continually, even finally to 0. And more and more application servers will be used to host the application which has the memory leak. Therefore, in an embodiment, a continual decrease of the throughput is a basis for determining that there may occur a memory leak. In addition, it is further needed to determine whether the memory usage percentage remains within a certain range. This is because when a memory leak occurs the memory will become more and more insufficient, thus in this embodiment, another basis for determining there may occur a memory leak is that the memory usage percentage will usually remain in a relatively high range. In this way, the cases where a failure of the flow controller or decrease of the rate of requests to the application server causes the throughput to decrease while the memory usage no longer remains in a predetermined range can be precluded; in these cases, although there may occur continual decrease of the throughput, this is not caused by a memory leak.

Further, the concept of continual decrease does not require a continual decrease in a strict sense, and even sometimes it may have temporary fluctuations therein, it may still be considered a continual decrease. Tolerance of temporary fluctuations can be determined based on the requirements for occurrence of a suspect memory leak by those skilled in the art.

Next step 203 in FIG. 2 is described, in which, in response to a continual decrease of the throughput and the memory usage remaining stable within the predetermined range, it is determined that a suspect memory leak occurs to the server.

The detection of a memory leak may be performed on a single or a set of application servers. When the detection is performed on a set of servers, the set of servers may provide the same, similar or different applications.

In an improved embodiment, the set of application servers run a cluster of the same or similar applications. Occurrence of a memory leak is usually related to deployed applications, thus detection of a memory leak performed on a cluster can enhance the accuracy of the determination. For example, in response to a counter exceeding 50% of the cluster size, the counter may be reset to zero, and a warning may be given on which application servers are suspected of having a memory leak.

In an embodiment, after step 203, it may further be determined whether the application server suspected of having a memory leak actually has a memory leak. When an application server suspected of having a memory leak is determined, any current method may be used to further determine whether a memory leak actually occurs. The prior art does not lack methods for performing memory leak detection on a specific application server. For example, the disclosed U.S. Pat. No. 7,434,206 reaches a conclusion on whether there is a memory leak by analyzing the characteristics of the allocation and release of objects in the memory. Alternatively, the disclosed U.S. Pat. No. 7,870,170 determines whether there is a memory leak by analyzing the characteristics of objects stored in the memory. However, all these methods are not applicable for detecting a server suspected of having a memory leak during runtime, while adopting the present invention can find an application server suspected of having a memory leak during runtime for further analysis and determination.

Figure 4:
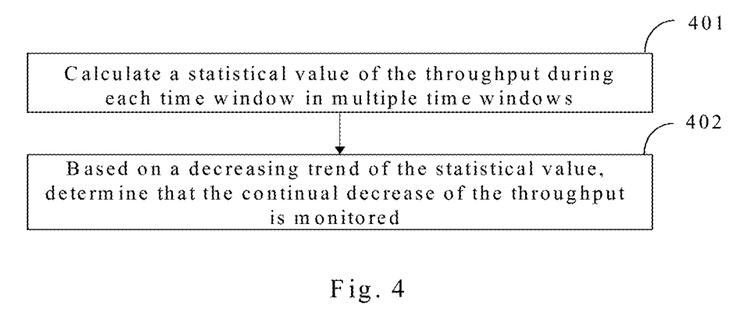
FIG. 4 illustrates an embodiment of monitoring that the throughput decreases continually in step 202 in FIG. 2.

FIG. 4 illustrates an embodiment of monitoring whether the throughput decreases continually in step 202 in FIG. 2.

In step 401, calculating a statistical value of the throughput during each time window in multiple time windows. The statistical values of the throughput in multiple time windows can be calculated by sliding in a predetermined step. The step can be set based on specific conditions by those skilled in the art, and can be larger or smaller than the size of a window. And depending on different values of the step, adjacent windows can overlap or be spaced apart.

A statistical value of the throughput in a window of a size of N is calculated based on the throughput information therein. The throughput information in a window represent the throughput information in a period of time, and the size N of the window is the length of the period of time. A larger N can enhance the accuracy of the detection, while a smaller N can enhance the flexibility of the detection. Those skilled in the art can set the value of N based on specific conditions. In an embodiment, the size of the window is 100 clock cycles.

During the window, there are multiple pieces of the throughput information collected in step 201 in FIG. 2, based on which the statistical value of the throughput is calculated. The statistical value of the throughput may be selected from one of the following: a minimum throughput, a maximum throughput, or an average throughput in the window. In an embodiment, minRate(i) is used to denote the minimum throughput in the $i^{th}$ window.

In step 402, based on a decreasing trend of the statistical value, determining that the continual decrease of the throughput is monitored. The monitoring of a decreasing trend of the throughput is the monitoring at least once of decrease in succession of the statistical value in at least two adjacent time windows. In an embodiment, if minRate(i)>>=minRate(i+1), the throughput may be considered decreasing. Alternatively, the continual decrease may also be determined based on the number of times when minRate(i)>>=minRate(i+1) exceeding a predetermined threshold. This may be applicable for the cases where the throughput rebounds temporarily.

Figure 5:
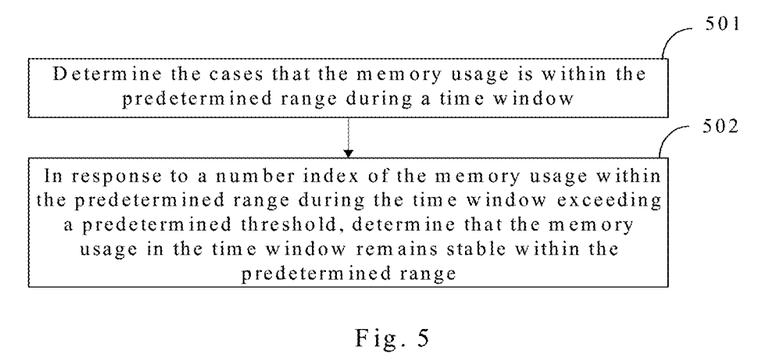
FIG. 5 illustrates an embodiment of monitoring that the memory usage remains stable within a predetermined range in step 202 in FIG. 2.

FIG. 5 illustrates an embodiment of monitoring whether the memory usage remains stable within the predetermined range in step 202 in FIG. 2. Likewise, the monitoring may be performed in the manner of a window, and mainly includes:

In Step 501, a determination is made whether the memory usage is within the predetermined range during a time window. The time window may be slid in a predetermined step to perform the real-time monitoring of whether the memory usage is within the predetermined range. Those skilled in the art can set the step based on specific conditions. The step may be either greater or less than the size of the window, and based on different values of the step, adjacent windows may overlap or be spaced apart with each other. The size M of the window is selected likewise to the size of the above mentioned window, and it may be either the same as or different from the size of the above mentioned window. The predetermined range may be a range around a target value of memory usage. In an embodiment, if the target value of memory usage is 80%, the predetermined range may be set as a symmetrical range of 75%-85%, or an unsymmetrical range of 75%-88%. Obviously, those skilled in the art may adjust the memory usage target and the corresponding predetermined range based on the requirements of specific conditions.

Step 502, in response to a number index of the memory usage within the predetermined range during the time window exceeding a predetermined threshold, determining that the memory usage in the time window remains stable within the predetermined range. The number index may be the number of cases that the memory usage is within the predetermined range in the time window, in which case the predetermined threshold is a number, for example, the value of 90 in an embodiment; the number index may also be a relative ratio, that is, the ratio of the number of cases that the memory usage is within the predetermined range in the whole number of memory usage samplings in the window, in which case, the predetermined threshold is a predetermined ratio, for example, the value of 95% in an embodiment.

A sampling component is configured to sample the throughput and memory usage of an application server.

A monitoring component is configured to monitor a continual decrease of the throughput based on the sampled throughput, and to monitor the memory usage remaining stable within a predetermined range based on the sampled memory usage;

A determining component configured to determine the server is suspected of having a memory leak.

Figure 6:
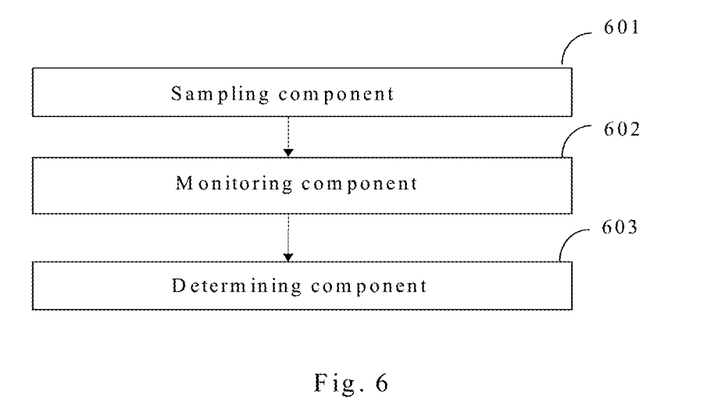
FIG. 6 is a block diagram of an apparatus for detecting a suspect memory leak.

Referring to FIG. 6, it illustrates a structural block diagram of a memory leak detection apparatus for detecting an application server suspected of having a memory leak of the present application, including:

A sampling component 601 configured to sample the throughput information and memory usage information of an application server. In an embodiment, the throughput information and memory usage information may be obtained from a flow controller. The throughput information and memory usage information may be collected in each control cycle of the flow controller. In another embodiment, the above information may also be collected after garbage collection, so as to make the collected information more accurate.

A monitoring component 602 configured to monitor whether the throughput decreases continually based on the sampled throughput, and to monitor whether the memory usage is stable within a predetermined range based on the sampled memory usage. The monitoring component may be in the application serer, for notifying memory anomalies of the application server. The monitoring component may also be in a proxy server, in which case, each application server will send its memory usage information and throughput information to the sampling component in the proxy server.

A determining component 603 configured to, in response to monitoring a continual decrease of the throughput and the memory usage remaining within a predetermined range, determine the server suspected of having a memory leak.

In an embodiment, the monitoring component of FIG. 6 includes: a statistical value calculating component configured to calculate a statistical value of the throughput during each time window in multiple time windows; a decrease determining component configured to determine monitoring the continual decrease of the throughput based on a decrease trend of the statistical value.

In an improved embodiment, the decrease trend of the statistical value is monitoring at least once of decrease in succession of the statistical value in at least two time windows.

In an improved embodiment, the statistical value of the throughput is selected from one of the following: a minimum throughput, a maximum throughput, or an average throughput in the time window.

In an embodiment, the monitoring component in FIG. 6 includes: a range comparison component configured to determine the cases that the memory usage in a time window is within the predetermined range; a stability determining component configured to, in response to the number of the cases that the memory usage in the time window is within the predetermined range exceeding a predetermined threshold, determine the memory usage in the time window is stable within the predetermined range.

In an improved embodiment, the sampling component is further configured to sample based on the period of flow control, the flow control being controlling the throughput of the application server based on the memory usage so that the memory usage does not exceed a target memory usage.

In an improved embodiment, the apparatus further includes a component configured to determine whether the application server suspected of having a memory leak actually has a memory leak.

In an improved embodiment, the apparatus further includes a component configured to, in response to the number of application servers suspected of having a memory leak exceeding a predetermined value, determine whether the application servers suspected of having a memory leak actually have a memory leak.

Figure 7:
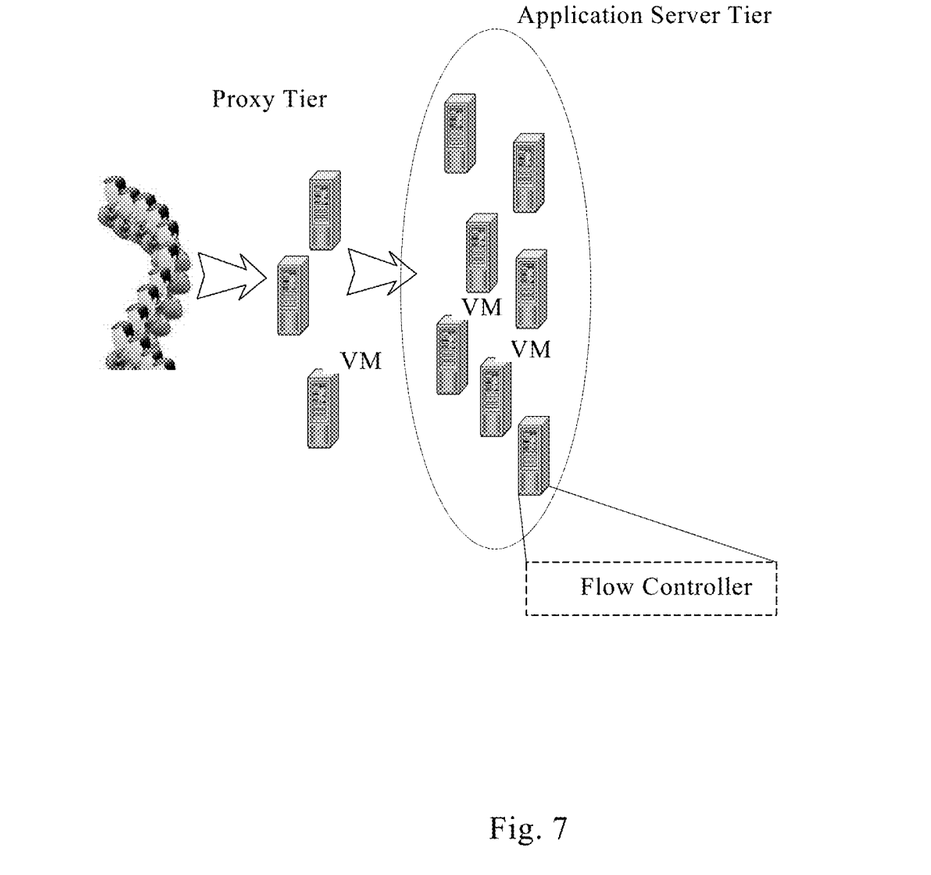
FIG. 7 is a block diagram of a system on which the present invention can be used to perform suspect memory leak detection.

FIG. 7 illustrates a block diagram of a system on which memory leak detection can be performed using the solution of the present application described above in a specific embodiment, including a proxy tier and an application server tier, wherein, the servers may take the form of a virtual machine (VM), for example, Java Virtual Machine (JVM), or a physical computer. In an implementation, memory leak detection may be performed on at lease one set of application servers running a cluster of the same or similar applications, or on an arbitrarily determined set of application servers.

A proxy server is a server between a user and an application server. The user sends a request to the proxy server, and the proxy sever forwards it to an application server and returns the processing result to the user.

To avoid overloading of an application server, a flow controller can be used to control the throughput of a server. The flow controller is a commonly used functional unit in the prior art for controlling the throughput of a controlled sever based on the memory usage of the controlled server, to ensure that the memory usage percentage do not exceed a target memory usage so as to achieve the object of maximizing the utilization of effective resources. Since a flow controller belongs to prior art, it will not be described herein, The steps and components in the method and system shown in FIG. 1 to FIG. 6 can be applied to the system shown in FIG. 7. Those skilled in the art can arrange the steps and components among the proxy tier and the application server tier according to practical requirements. For example, in an embodiment, all the steps and components may be implemented in each application server, the detection step or component step being in the application server for notifying memory anomalies of the application server. In another embodiment, the detection component can be in a proxy sever, in which case, each application server sends its memory usage information and throughput information to a collection component in the proxy sever.

It should be pointed out that the above description is only illustration, rather than limitation to the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining a suspect memory leak on an application server, comprising:
   sampling request throughput and memory usage of the application server;
   monitoring, based on the sampled throughput, whether the throughput trends in a decreasing direction based on calculating a statistical value of the throughput during each time window in multiple time windows;
   monitoring, based on the sampled memory usage, whether the memory usage is substantially stable at a target memory value; and
   determining, in response to the throughput trending in a decreasing direction and the memory usage being substantially stable at the target memory value, that the application server is suspected of having a memory leak.

2. The method of claim 1, wherein, the statistical value of the throughput decreases in succession of the statistical value in at least two adjacent time windows.

3. The method of claim 1, wherein, the statistical value of the throughput is selected from the group consisting of: a minimum throughput; a maximum throughput; and an average throughput in the time window.

4. The method of claim 1, wherein monitoring, based on the sampled memory usage, whether usage remains substantially stable at a target memory value comprises:
   determining the number of memory usage samples in a time window that are within a predetermined range about the target memory value; and
   determining, in response to the number of the memory usage samples in the time window within the predetermined range exceeding a predetermined threshold, that the memory usage in the time window is substantially stable at the target memory value.

5. The method of claim 4, wherein the predetermined range about the target memory value is one or more of: symmetric about the target memory value, asymmetric about the target memory value, approximately 10% of total memory.

6. The method of claim 1, wherein the sampling is performed during a period of request flow control.

7. The method of claim 1, further comprising:
   determining whether the application server suspected of having a memory leak actually has a memory leak.

8. The method of claim 1, a plurality of application servers forming an application server tier, further comprising:
   identifying one or more application servers suspected of having memory leaks;
   determining that the identified application servers suspected of having memory leaks actually have memory leaks if the number of application servers in the application server tier suspected of having memory leaks exceed a predetermined value.

9. An apparatus for detecting a suspect memory leak on an application server, comprising:
   a sampling component configured to sample request throughput information and memory usage information of the application server;
   a monitoring component configured to monitor whether the sampled throughput trends in a decreasing direction based on calculating a statistical value of the throughput during each time window in multiple time windows, and to monitor whether the sampled memory usage is substantially stable at a target memory value; and
   a determining component configured to, in response to the throughput trending in a decreasing direction and the memory usage being substantially stable at the target memory value, determine the server is suspected of having a memory leak.

10. The apparatus of claim 9, wherein, the statistical value of the throughput decreases in succession of the statistical value in at least two time windows.

11. The apparatus of claim 9, wherein the statistical value of the throughput is selected from the group consisting of: a minimum throughput; a maximum throughput; and an average throughput in the time window.

12. The apparatus of claim 9, wherein the monitoring component comprises:
   a range comparison component configured to determine the number of memory usage samples in a time window that are within a predetermined range about the target memory value; and
   a stability determining component configured to, in response to the number of memory usage samples in the time window within the predetermined range exceeding a predetermined threshold, determine that the memory usage in the time window is substantially stable at the target memory value.

13. The apparatus of claim 12, wherein the predetermined range about the target memory value is one or more of: symmetric about the target memory value, asymmetric about the target memory value, approximately 10% of total memory.

14. The apparatus of claim 9, wherein the sampling component is further configured to sample during a period of request flow control.

15. The apparatus of claim 9, further comprising:
   a component configured to determine whether the application server suspected of having a memory leak actually has a memory leak.

16. The apparatus of claim 9, a plurality of application servers forming an application server tier, further comprising:
   a component configured to, in response to the determining component identifying one or more application servers in the application server tier suspected of having a memory leak, the number of identified application servers exceeding a predetermined value, determine that the application servers suspected of having a memory leak actually have a memory leak.

17. A computer readable non-transitory storage medium tangibly embodying computer readable program code having computer readable instructions which, when implemented, cause a computer that comprises system hardware resources to carry out the steps of a method of determining a suspect memory leak on an application server, comprising:
   sampling request throughput and memory usage of the application server;
   monitoring, based on the sampled throughput, whether the throughput trends in a decreasing direction based on calculating a statistical value of the throughput during each time window in multiple time windows;
   monitoring, based on the sampled memory usage, whether the memory usage is substantially stable at a target memory value; and
   determining, in response to the throughput trending in a decreasing direction and the memory usage being substantially stable at the target memory value, that the application server is suspected of having a memory leak.

18. The computer readable non-transitory storage medium of claim 17, wherein monitoring, based on the sampled memory usage, whether usage remains substantially stable at a target memory value comprises:

determining the number of memory usage samples in a time window that are within a predetermined range about the target memory value; and     determining, in response to the number of the memory usage samples in the time window within the predetermined range exceeding a predetermined threshold, that the memory usage in the time window is substantially stable at the target memory value.

19. The computer readable non-transitory storage medium of claim 18, wherein the predetermined range about the target memory value is one or more of: symmetric about the target memory value, asymmetric about the target memory value, approximately 10% of total memory.

\* \* \* \* \*